United States Patent
Ohl, Jr. et al.

(10) Patent No.: US 9,803,739 B2
(45) Date of Patent: Oct. 31, 2017

(54) GEARBOX ADJUSTMENT SYSTEM

(71) Applicant: General Electric Company, Schenectady, NY (US)

(72) Inventors: Richard Arland Ohl, Jr., Hudson, NY (US); Gregory Clarence Thomas, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 225 days.

(21) Appl. No.: 14/687,976

(22) Filed: Apr. 16, 2015

(65) Prior Publication Data

US 2016/0305532 A1    Oct. 20, 2016

(51) Int. Cl.
| | | |
|---|---|---|
| *F16H 57/025* | (2012.01) | |
| *B23P 19/04* | (2006.01) | |
| *F01D 25/28* | (2006.01) | |
| *F16H 57/02* | (2012.01) | |

(52) U.S. Cl.
CPC . *F16H 57/025* (2013.01); *F16H 2057/02078* (2013.01)

(58) Field of Classification Search
CPC ........ F16H 57/025; F03D 15/00; F03D 80/00; F03D 80/50
See application file for complete search history.

(56) References Cited

U.S. PATENT DOCUMENTS

| | | | |
|---|---|---|---|
| 7,721,434 B2 | 5/2010 | Weaver et al. | |
| 8,794,922 B2 | 8/2014 | Bart et al. | |
| 2007/0025840 A1* | 2/2007 | Weaver | F03D 13/10 415/122.1 |
| 2010/0111665 A1* | 5/2010 | Daniels | B66C 23/207 414/814 |
| 2012/0141292 A1* | 6/2012 | Signore | B66C 1/108 416/244 R |
| 2013/0216403 A1* | 8/2013 | Salter | F04B 1/053 417/222.1 |
| 2015/0007693 A1* | 1/2015 | Trede | F16H 57/021 74/606 R |
| 2016/0263715 A1* | 9/2016 | Gerber | B23P 19/042 |

FOREIGN PATENT DOCUMENTS

DE        102012205086      * 10/2013

OTHER PUBLICATIONS

Define may—Google Search, Mar. 1, 2017.*
Define generally—Google Search, Mar. 1, 2017.*
Co-Pending U.S. Appl. No. 14/687,996, filed Apr. 16, 2015.

* cited by examiner

*Primary Examiner* — Vinh Luong
(74) *Attorney, Agent, or Firm* — Dority & Manning, P.A.

(57) ABSTRACT

A system for adjusting and/or restraining a gearbox of a wind turbine includes a base component fixed to the gearbox and a vertical displacement device configured atop the base component. As such, the vertical displacement device is configured to apply a force to the base component. Accordingly, by lifting the vertical displacement device, a downward vertical force is applied to the base component so as to adjust (i.e. lower) the gearbox.

18 Claims, 8 Drawing Sheets

GEARBOX ADJUSTMENT SYSTEM

FIELD OF THE INVENTION

The present disclosure relates generally to wind turbines, and more particularly to a gearbox adjustment/restraint system for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and a blade root of the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During operation, the gearbox may become vertically displaced. In addition, the gearbox may need to be repaired uptower due to normal wear and tear and/or excessive loading. For example, in some instances, the trunnion pins that secure the gearbox to the bedplate via the torque arms and/or their corresponding bore holes may become worn. As such, the gearbox may become displaced as the lose pins become ineffective at restraining the gearbox during operation. To repair the gearbox and repair the pins, it is necessary to relocate the displaced gearbox back to its original location. Completing such a task uptower, however, is difficult if not impossible due to the weight of the gearbox.

Still further damage may occur in the gearbox due to wear and tear and/or excessive loading which may also require an operator to lift and/or lower the gearbox in a vertical direction. Thus, a gearbox adjustment/restraint system configured to address the aforementioned issues would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a system for adjusting a height of a gearbox of a wind turbine. The system includes a base component fixed to the gearbox and a vertical displacement device configured atop the base component. The vertical displacement device is configured to apply a force to the base component. More specifically, by raising the vertical displacement device, a downward vertical force is applied to the base component so as to lower the gearbox.

In one embodiment, for example, the vertical displacement device includes at least one hydraulic cylinder configured atop the base component, a lifting member configured atop the hydraulic cylinder, and a sling system configured with the lifting member. In another embodiment, the base component may include a top support portion and a bottom attachment portion. Further, the top support portion may include a support surface and the bottom attachment portion may include a pin and corresponding bore holes. As such, in certain embodiments, the bottom attachment portion is configured to secure the base component to a torque arm of the gearbox by inserting the pin through the corresponding bore holes and a lifting eye of the torque arm. In addition, when mounted to the gearbox, the support surface of the bottom attachment portion may create a horizontal plane with respect to a longitudinal axis of the gearbox.

In further embodiments, the sling system may include at least one sling and one or more connecting devices. More specifically, one end of the sling may be secured to the lifting member via the connecting devices and an opposite end of the sling may be secured to a fixed location of the wind turbine. For example, in certain embodiments, the connecting devices may correspond to one or more connecting links or shackles. In addition, the fixed location of the wind turbine may include a wind turbine bedplate. As such, the sling(s) may be secured to the bedplate via a rib configured therein. Accordingly, in certain embodiments, by raising the hydraulic cylinder, the lifting member is also raised so as to tighten the sling which applies the downward vertical force to the base component, thereby lowering the gearbox.

In another embodiment, the vertical displacement device may include one or more vertical support members configured to support the lifting member in an unloaded position.

In additional embodiments, the vertical displacement device may also include an additional hydraulic cylinder configured below or underneath the support surface of the base component.

In another aspect, the present disclosure is directed to a system for adjusting a gearbox of a wind turbine. The system includes a base component fixed to the gearbox and a displacement device configured atop the base component. The displacement device is configured to move the gearbox by applying a force to the base component. Further, the displacement device may include a hydraulic cylinder configured atop the base component a spreader bar configured atop the hydraulic cylinder, and a sling system configured with the spreader bar and secured to a fixed location on the wind turbine, e.g. the bedplate. As such, the displacement device is configured to apply a force to the base component so as to move the gearbox.

In yet another aspect, the present disclosure is directed to a gearbox restraint system for a gearbox of a wind turbine. The gearbox restraint system includes a base component fixed to the gearbox, and a restraint device configured atop the base component. The restraint device is configured to restrain the gearbox by applying a force to the base component. Further, the restraint device includes at least one hydraulic cylinder configured atop the base component, a spreader bar configured atop the hydraulic cylinder, and a sling system configured with the spreader bar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a gearbox adjustment/restraint system for vertically displacing or restraining a gearbox of a wind turbine. For example, the system includes a base component fixed to the gearbox and a vertical displacement device configured atop the base component. The base component creates a horizontal support surface with respect to the gearbox such that the vertical displacement device can lift, lower, and/or restrain the gearbox by applying a force to the support surface. As such, the gearbox adjustment/restraint system is configured to restrain the gearbox so as to allow for fine adjustments of a height of the gearbox.

The present disclosure includes many advantages not present in the prior art. For example, the system of the present disclosure allows for uptower repair of wind turbine gearboxes that otherwise could not be repaired. Further, the present disclosure is capable of restraining the gearbox during repairs and/or maintenance. As such, the present disclosure decreases repair and/or maintenance costs and associated time.

Figure 1:
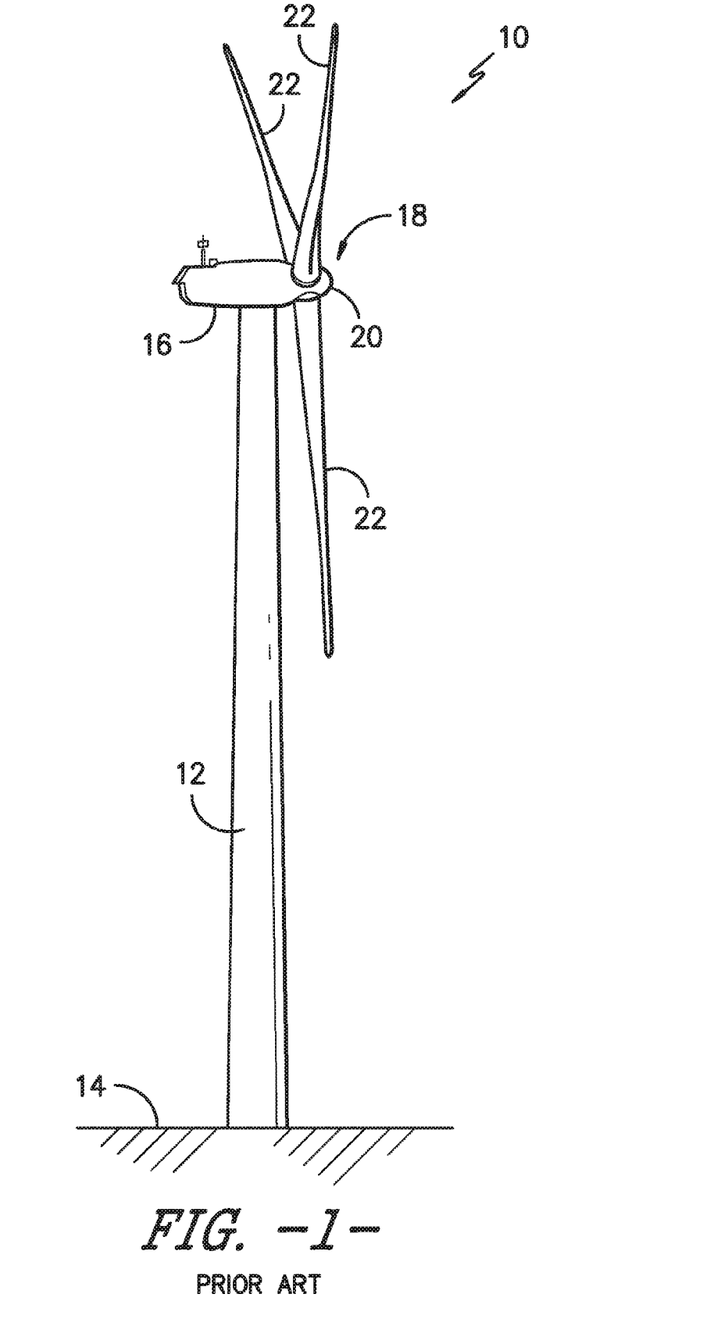
FIG. 1 illustrates a perspective view of a wind turbine according to conventional construction.

Referring now to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
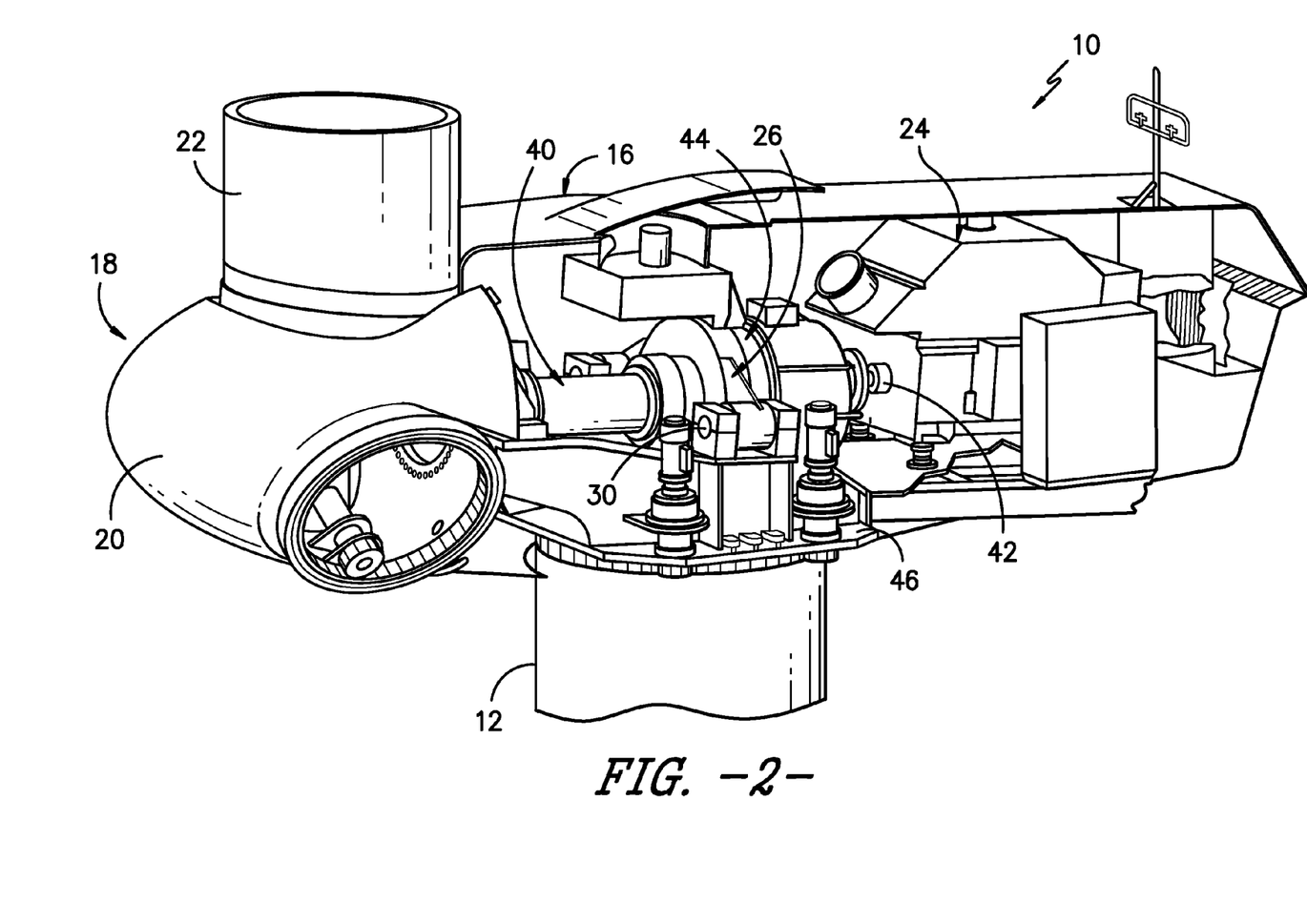
FIG. 2 illustrates a detailed, internal view of a nacelle of a wind turbine according to conventional construction.

Referring now to FIG. 2, a simplified, internal view of one embodiment of the nacelle 16 of the wind turbine 10 of FIG. 1 is illustrated. As shown, the generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44.

It should be appreciated that the rotor shaft 40, gearbox 44, and generator 24 may generally be supported within the nacelle 16 by a support frame or bedplate 46 positioned atop the wind turbine tower 12. Further, as shown, the gearbox 44 is typically mounted to the bedplate 46 via a torque arm 26 or trunnion which is used as a mounting point for the gearbox 44 and allows for limited movement of the gearbox 44 due to torque variations. As used herein, the torque arm 26 or trunnion generally refers to a protrusion used as a mounting and/or pivoting point. Accordingly, as shown in the illustrated embodiment, the torque arm 26 is generally mounted to the bedplate 46 via one or more trunnion pins 30.

During operation, the gearbox 44 may become vertically displaced due to normal wear and tear and/or excessive loading. For example, in some instances, the trunnion pins 30 that secure the gearbox 44 to the bedplate 46 and/or their corresponding bore holes may become worn, thereby causing displacement of the gearbox 44. Accordingly, the present disclosure is directed to a gearbox adjustment/restraint system that restrains the gearbox 44 so as to allow for fine adjustments of a height of the gearbox 44 and/or repair of the gearbox 44.

Figure 3:
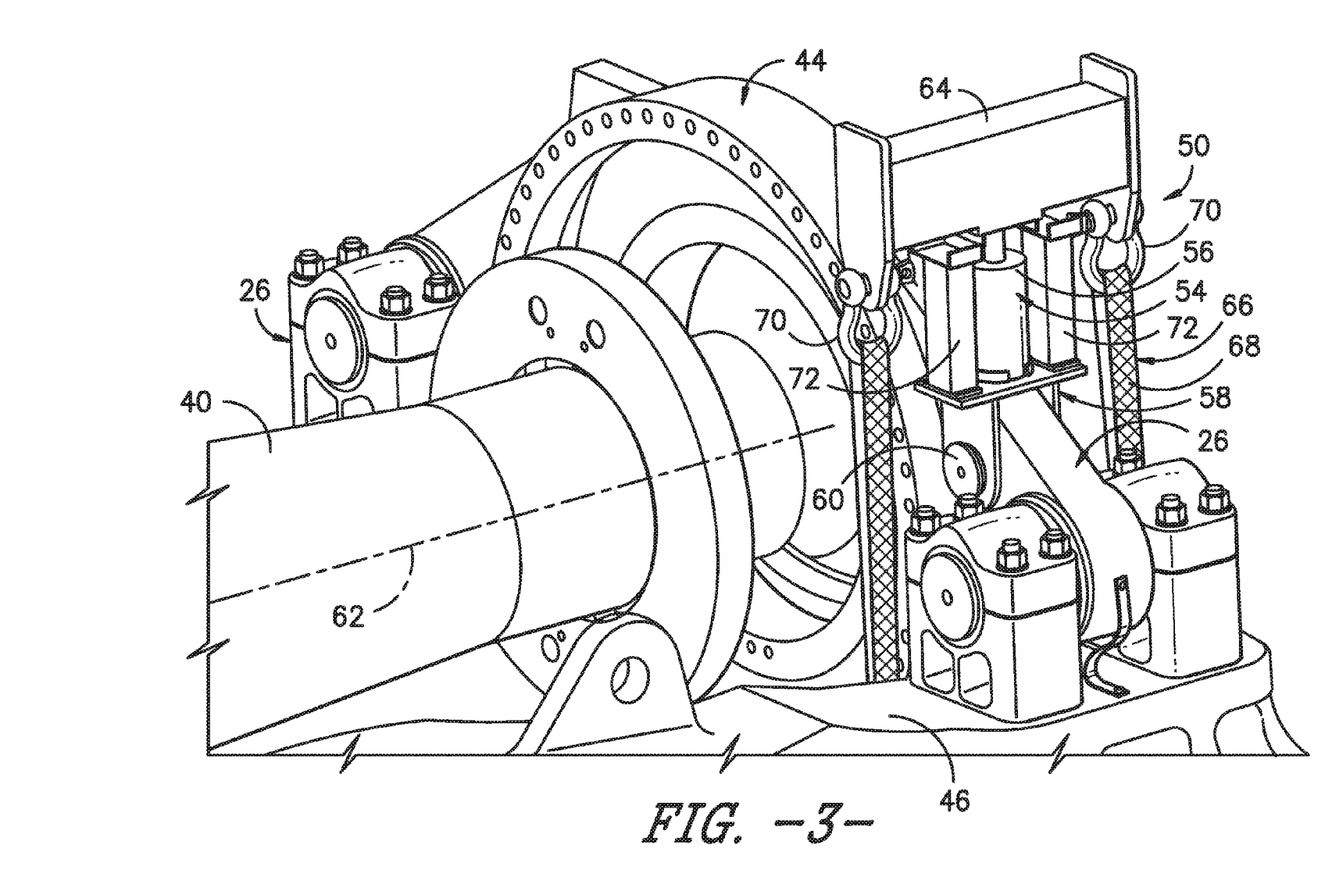
FIG. 3 illustrates a perspective view of one embodiment of a gearbox of a wind turbine, particularly illustrated a gearbox adjustment/restraint system configured thereon according to the present disclosure.
Figure 4:
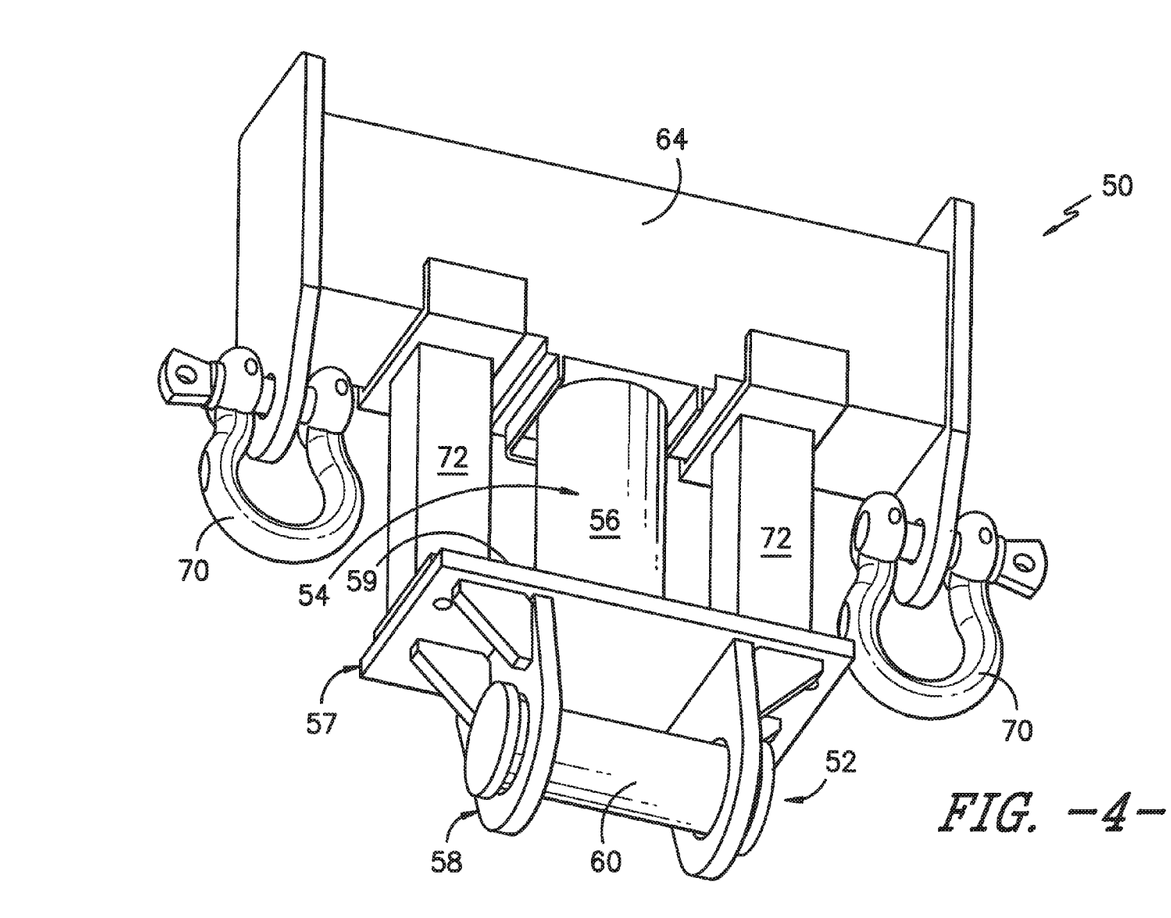
FIG. 4 illustrates a perspective view of one embodiment of a gearbox adjustment/restraint system according to the present disclosure.
Figure 5:
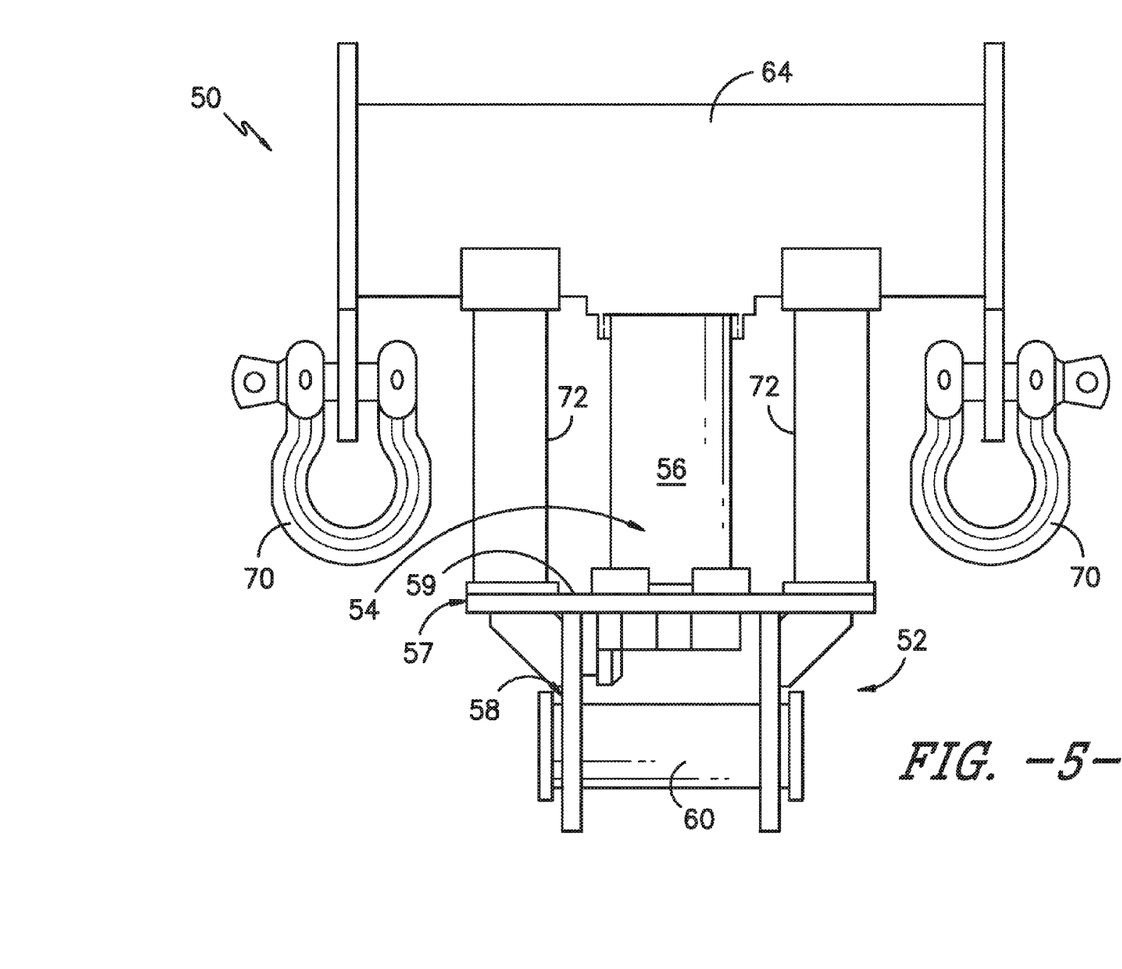
FIG. 5 illustrates a front view of one embodiment of a gearbox adjustment/restraint system according to the present disclosure.
Figure 6:
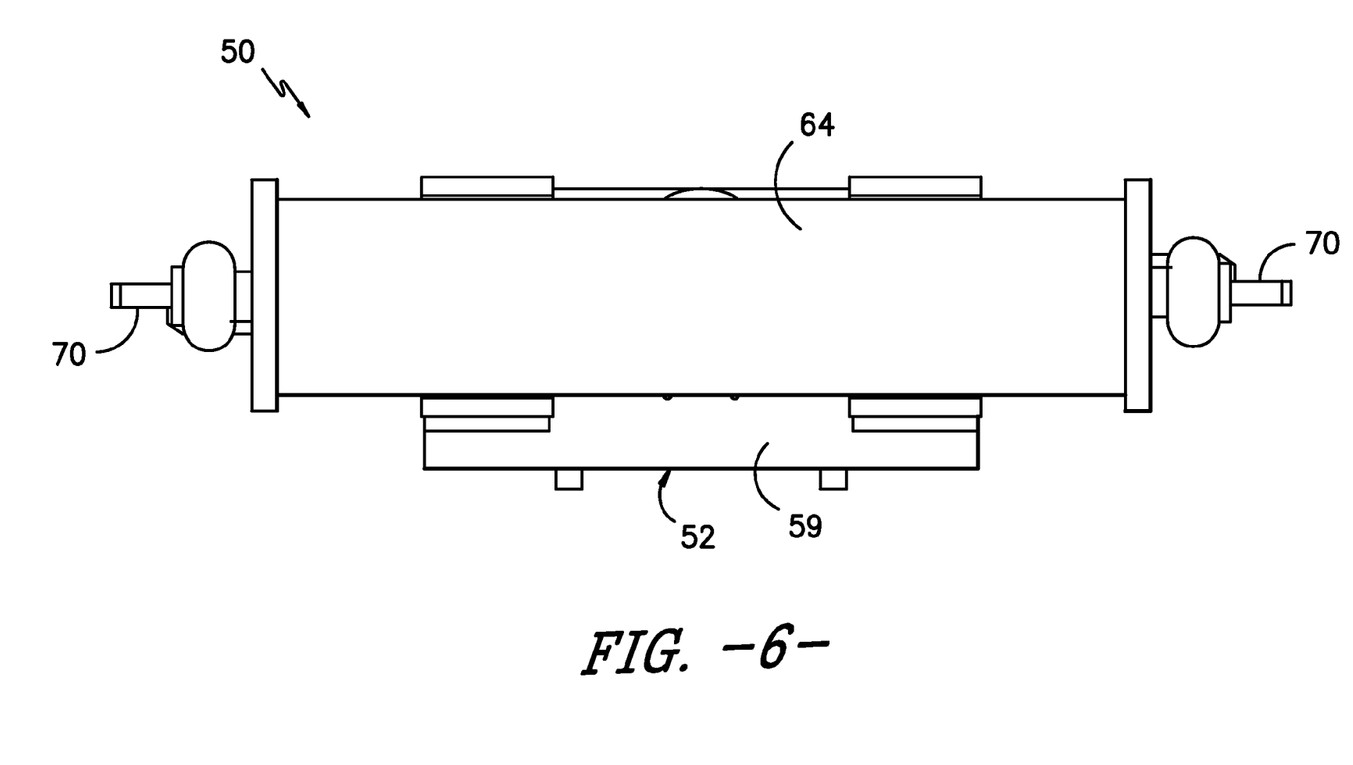
FIG. 6 illustrates a top view of one embodiment of a gearbox adjustment/restraint system according to the present disclosure.
Figure 7:
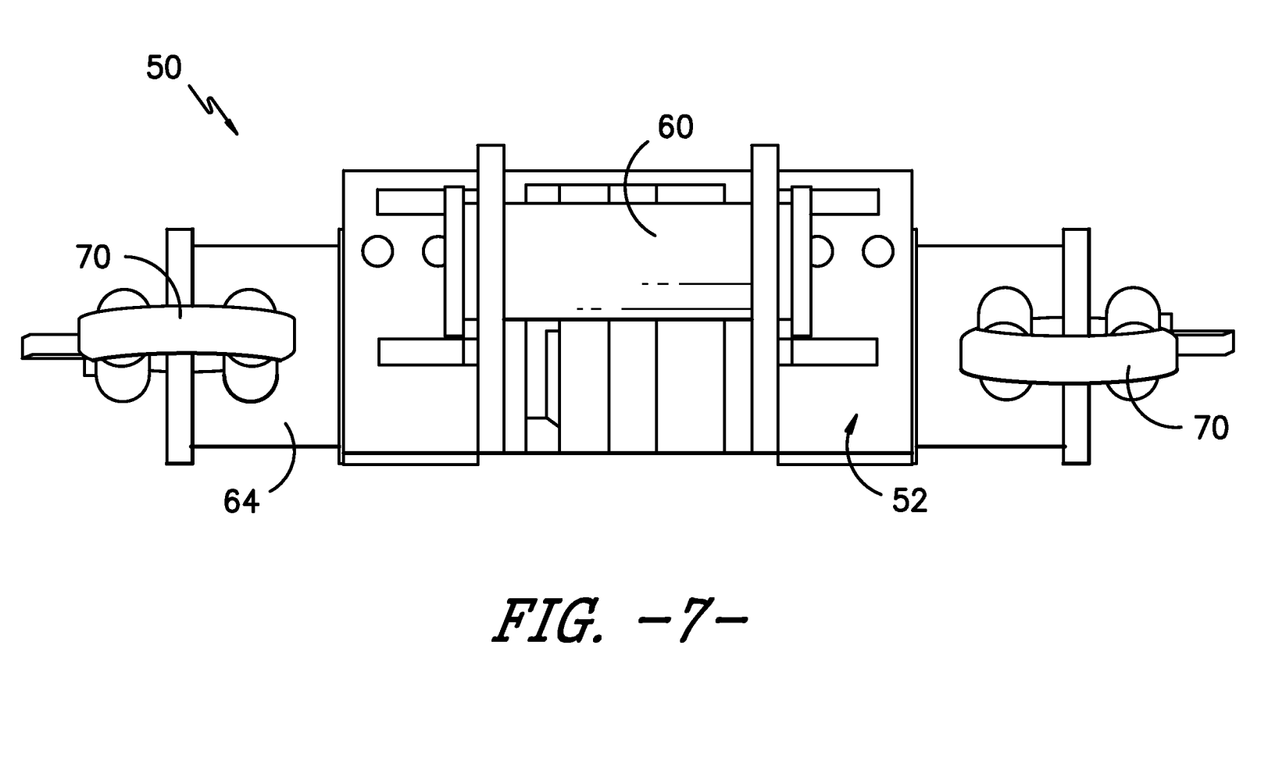
FIG. 7 illustrates a bottom view of one embodiment of a gearbox adjustment/restraint system according to the present disclosure.
Figure 8:
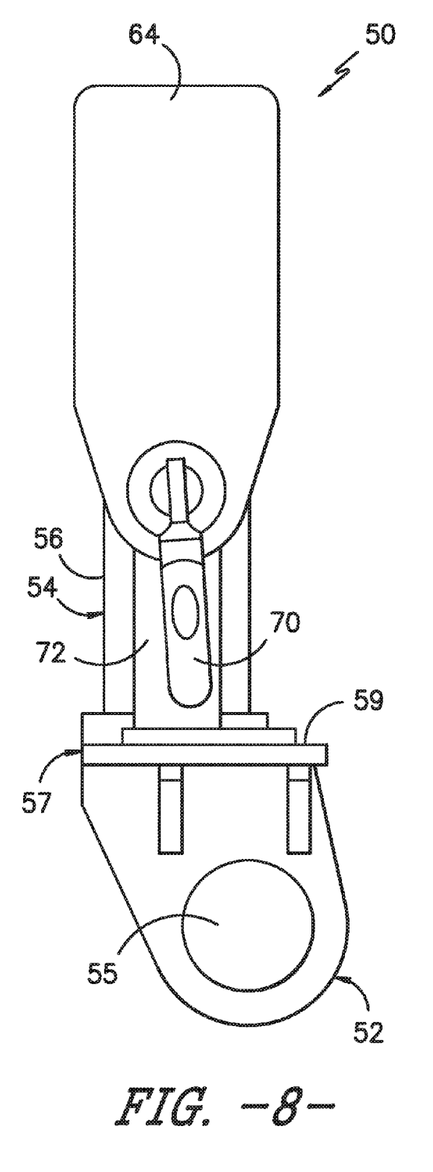
FIG. 8 illustrates a side view of one embodiment of a gearbox adjustment/restraint system according to the present disclosure.
Figure 9:
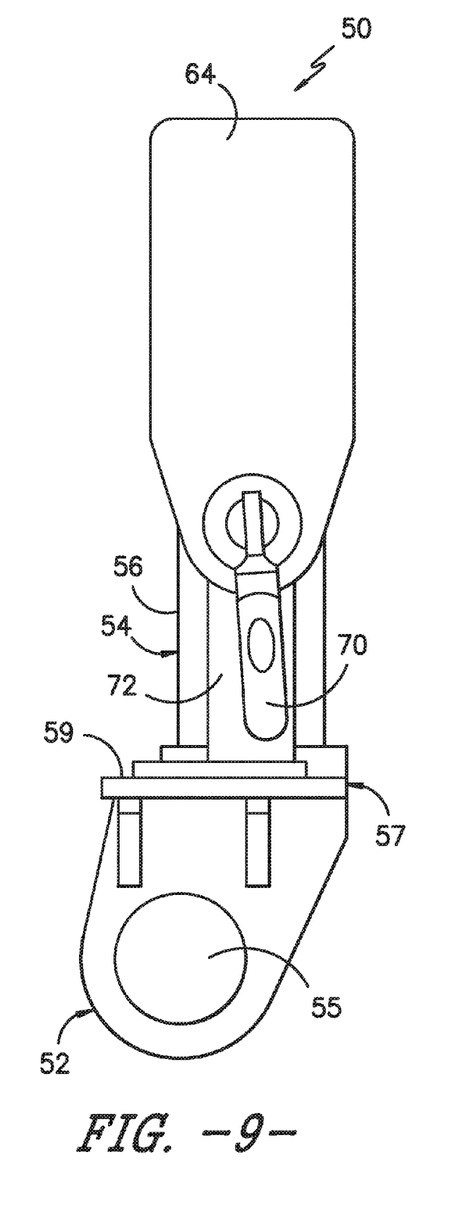
FIG. 9 illustrates another side view of one embodiment of a gearbox adjustment/restraint system according to the present disclosure.

For example, as shown in FIG. 3, a partial, perspective view of the interface between the main rotor shaft 40 and the gearbox 44 having a gearbox adjustment/restraint system 50 mounted thereon according to the present disclosure is illustrated. As shown, the gearbox adjustment system 50 is configured to mount to the torque arm 26 of the gearbox 44. More specifically, the gearbox adjustment system 50 may be mounted to a lifting eye of the torque arm 26.

In addition, as shown generally in FIGS. 3-9, the gearbox adjustment system 50 includes a base component 52 fixed to the gearbox 44 and a vertical displacement device 54 configured atop the base component 52. As such, the vertical displacement device 54 is configured to lift, lower, or restrain the gearbox 44 by applying a force to the base component 52. For example, by raising the vertical displacement device 54, a downward vertical force is applied to the base component 52 so as to lower the gearbox 44.

More specifically, as shown in FIGS. 5-9, the base component 52 typically includes a top support portion 57, a bottom attachment portion 58, and a connecting component 60 configured through the bottom attachment portion 58 so as to secure the base component 52 to the torque arm 26. The top support portion 57 includes a support surface 59 for supporting the vertical displacement device 54. For example, in certain embodiments, the support surface 59 may form a horizontal plane with respect to a longitudinal axis 62 of the gearbox 44. As such, the horizontal plane allows for a downward force to be applied to the gearbox 44. In certain embodiments, for example, this force can be created by a hydraulic device (as described below) and applied to a lifting member formed by a lifting beam 64 or bar placed horizontally on the hydraulic device.

The connecting component 60 may be a pin that fits through corresponding bore holes 55 of the bottom attachment portion 58. For example, in such embodiments, the pin 60 may secure the base component 52 to the torque arm 26 of the gearbox 44 through a lifting eye of the torque arm 26. The pin 60 may include any suitable pin now known or later developed in the art. Further, the pin 60 may be secured through the lifting eye of the torque arm 26 via an interference fit, threads, nuts and/or washers, or similar. In addition, the base component 52 may be secured to the torque arm 26 via any other suitable connecting components such as, for example, fasteners, clamps, and the like.

Referring particularly to FIGS. 3-9, the vertical displacement device 54 may include at least one hydraulic cylinder 56 configured atop the support surface 58 of the base component 52, a lifting member 64 or bar configured atop the hydraulic cylinder 56, and a sling system 66 configured with the lifting member 64. Further, the vertical displacement device 54 may include one or more vertical support members 72 configured to support the lifting member 64 in an unloaded position. The lifting member 64 as described herein generally refers to a lifting device or spreader bar that is used to distribute forces of the gearbox adjustment system 50.

Based on the geometry of the gearbox torque arm 26, the gearbox adjustment system 50 of the present disclosure properly transmits force through the torque arm 26. More specifically, the hydraulic cylinder 56 reacts off of the lifting member 64 placed on top of the cylinder 56. The lifting member 64 is also attached to the sling system 66 that wraps around the bedplate webbing to create an appropriate reaction point. As such, the system 50 allows the gearbox 44 to be restrained and finely adjusted and/or restrained in the vertical direction.

More specifically, in certain embodiments, the sling system 66 may include at least one sling 68 attached to the lifting member 64, e.g. via one or more connecting devices 70. For example, in certain embodiments, the connecting devices 70 may correspond to connecting links or shackles as are generally known in the art. As such, in particular embodiments, one end of the sling 68 may be secured to the lifting member 64 via the shackles 70 while an opposite end of the sling 68 may be wrapped around a fixed location of the wind turbine 10, e.g. the bedplate 46, using any suitable means. More specifically, in specific embodiments, the sling system 66 may include a single sling 68 having a first end and a second end configured in a basket configuration for rigging. For example, the first end is configured with a first shackle 70 such that a portion of the sling 68 is wrapped underneath a portion of the bedplate 46, e.g. via a rib or webbing (not shown), and the second end returns up to the spreader bar 64 and is configured with a second shackle 70 on an opposite side of the spreader bar 64. In additional embodiments, the sling system 66 may also include one or more additional connecting devices 70 attached to the bedplate 46, e.g. by welding, bolting or any other suitable means, such that the sling(s) 68 can be connected thereto. As such, by raising the hydraulic cylinder 56, the sling 68 is tightened and the gearbox 44 is pulled down. More specifically, by raising the hydraulic cylinder 56, the lifting member 64 is also raised so as to tighten the sling 68 which applies a downward vertical force to the base component 52 (i.e. the support surface 58), thereby lowering the gearbox 44. By lowering the cylinder 56, the gearbox 44 can be raised. As such, the system 50 allows for finite adjustment on the height of the gearbox 44 while still allowing the gearbox 44 to be fully restrained.

In addition, the system 50 is configured to restrain the gearbox 44 during maintenance and/or repair. In such embodiments, the vertical displacement device 54 may also include one or more additional hydraulic cylinders configured below or underneath the support surface 58 of the base component 52. As such, the additional hydraulic cylinders are configured to stabilize the gearbox adjustments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for adjusting a height of a gearbox of a wind turbine, the system comprising:
    a base component fixed to the gearbox; and,
    a vertical displacement device comprising at least one hydraulic cylinder configured atop the base component, a lifting beam configured atop the at least one hydraulic cylinder, and a sling system secured to the lifting beam and a fixed location of the wind turbine,
    wherein, by raising the at least one hydraulic cylinder, the lifting beam is pushed upward such that a downward vertical force is applied to the base component via the sling system so as to lower the gearbox.

2. The system of claim 1, wherein the base component comprises a top support portion and a bottom attachment portion.

3. The system of claim 2, wherein the top support portion further comprises a support surface, wherein the bottom attachment portion further comprises a pin and corresponding bore holes.

4. The system of claim 3, wherein the bottom attachment portion is configured to secure the base component to a torque arm of the gearbox by inserting the pin through the corresponding bore holes and the torque arm.

5. The system of claim 3, wherein the support surface forms a horizontal plane with respect to a longitudinal axis of the gearbox.

6. The system of claim 3, wherein the vertical displacement device further comprises an additional hydraulic cylinder configured underneath the support surface of the base component.

7. The system of claim 1, wherein the sling system further comprises at least one sling and one or more connecting devices, wherein one end of the sling is secured to the lifting beam via the connecting devices and an opposite end of the sling is secured to the fixed location of the wind turbine.

8. The system of claim 7, wherein, by raising the at least one hydraulic cylinder, the lifting beam is lifted so as to tighten the sling which applies the downward vertical force to the base component, thereby lowering the gearbox.

9. The system of claim 7, wherein the fixed location of the wind turbine comprises a bedplate of the wind turbine.

10. The system of claim 1, wherein the vertical displacement device further comprises one or more vertical support members configured to support the lifting beam in an unloaded position.

11. A gearbox restraint system for a gearbox of a wind turbine, the gearbox restraint system comprising:
   a base component fixed to the gearbox; and,
   a restraint device comprising at least one hydraulic cylinder configured atop the base component, the restraint device configured to restrain the gearbox by applying a force to the base component, a lifting beam configured atop the hydraulic cylinder, and a sling system secured between the lifting beam and a fixed location of the wind turbine;
   wherein, by raising the at least one hydraulic cylinder, the lifting beam is pushed upward such that a force is applied to the base component via the sling system so as to restrain the gearbox.

12. The gearbox restraint system of claim 11, wherein the base component comprises a top support portion and a bottom attachment portion.

13. The gearbox restraint system of claim 12, wherein the top support portion further comprises a support surface, wherein the bottom attachment portion further comprises a pin and corresponding bore holes.

14. The gearbox restraint system of claim 13, wherein the bottom attachment portion is configured to secure the base component to a torque arm of the gearbox by inserting the pin through the corresponding bore holes and the torque arm.

15. The gearbox restraint system of claim 13, wherein the support surface forms a horizontal plane with respect to a longitudinal axis of the gearbox.

16. The gearbox restraint system of claim 11, wherein the sling system further comprises at least one sling and one or more connecting devices, wherein one end of the sling is secured to the lifting beam via the connecting devices and an opposite end of the sling is secured to the fixed location of the wind turbine.

17. The gearbox restraint system of claim 16, wherein the fixed location of the wind turbine comprises a bedplate of the wind turbine.

18. The gearbox restraint system of claim 11, wherein the vertical displacement device further comprises one or more vertical support members configured to support the lifting beam in an unloaded position.

* * * * *